United States Patent
Spanos et al.

(10) Patent No.: US 9,608,829 B2
(45) Date of Patent: Mar. 28, 2017

(54) SYSTEM AND METHOD FOR CREATING A MULTI-BRANCHED BLOCKCHAIN WITH CONFIGURABLE PROTOCOL RULES

(71) Applicant: BLOCKCHAIN TECHNOLOGIES CORPORATION, New York, NY (US)

(72) Inventors: Nikolaos Spanos, New York, NY (US); Andrew R. Martin, New York, NY (US); Eric T. Dixon, North Bergen, NJ (US); Asterios Steven Geros, New York, NY (US)

( * ) Notice: Subject to any disclaimer, the term of this patent is extended or adjusted under 35 U.S.C. 154(b) by 0 days.

(21) Appl. No.: 14/809,062

(22) Filed: Jul. 24, 2015

(65) Prior Publication Data

US 2016/0028552 A1  Jan. 28, 2016

Related U.S. Application Data

(60) Provisional application No. 62/029,409, filed on Jul. 25, 2014, provisional application No. 62/090,370, filed on Dec. 11, 2014, provisional application No. 62/112,130, filed on Feb. 4, 2015, provisional application No. 62/170,131, filed on Jun. 3, 2015, (Continued)

(51) Int. Cl.
*H04L 29/06* (2006.01)
*H04L 9/32* (2006.01)
*G06F 21/64* (2013.01)

(52) U.S. Cl.
CPC .......... *H04L 9/3297* (2013.01); *G06F 21/645* (2013.01); *H04L 9/3242* (2013.01); *H04L 9/3268* (2013.01)

(58) Field of Classification Search
CPC ... H04L 9/3297; H04L 9/3268; H04L 9/3242; G06F 12/0246; G06F 12/1408; G06F 2212/7209; G06F 2212/1052
See application file for complete search history.

(56) References Cited

U.S. PATENT DOCUMENTS 7,895,349 B2 * 2/2011 Hoffmann ............ G06Q 10/107
                                                        709/203
2002/0194209 A1 * 12/2002 Bolosky ............ G06F 17/30097
(Continued)

OTHER PUBLICATIONS

A comparative analysis of the security aspects of the multimedia key exchange protocols|http://delivery.acm.org/10.1145/1600000/1595640/a2-floroiu.pdf?ip=151.207.250.61&id=1595640&acc=ACTIVE%20SERVICE&key=C15944E53D0ACA63%2E4D4702B0C3E38B35%2E4D4702B0C3E38B35%2E4D4702B0C3E38B35&CFID=785439718&CFTOKEN=60991748&_acm_=1463249716_9cade2b86280fa1d40097f5bad10a974| Floroiu et al.| 2009|pp. 1-10.*

(Continued)

*Primary Examiner* — Mahfuzur Rahman
(74) *Attorney, Agent, or Firm* — James M. Smedley LLC; James Michael Smedley, Esq.

(57) ABSTRACT

The present invention generally relates to blockchain technology. Specifically, this invention relates to creating a blockchain called a slidechain that allows for multiple valid branches or forks to propagate simultaneously with a customized set of protocol rules embedded in and applied to each fork chain that branches from another chain. The invention generally provides a computer-implemented method for accessing, developing and maintaining a decentralized database through a peer-to-peer network, to preserve the original state of data inputs while adapting to changing circumstances, user preferences, and emerging technological capabilities.

16 Claims, 5 Drawing Sheets

Related U.S. Application Data provisional application No. 62/185,613, filed on Jun. 27, 2015.

(56) References Cited

U.S. PATENT DOCUMENTS

| | | | |
|---|---|---|---|
| 2005/0138081 A1* | 6/2005 | Alshab | G06Q 10/06 |
| 2010/0138508 A1* | 6/2010 | Hoffmann | H04L 67/02 |
| | | | 709/206 |
| 2015/0026072 A1* | 1/2015 | Zhou | H04M 1/72522 |
| | | | 705/71 |
| 2015/0332283 A1* | 11/2015 | Witchey | G06Q 30/018 |
| | | | 705/3 |
| 2016/0085955 A1* | 3/2016 | Lerner | G06F 21/31 |
| | | | 726/20 |

OTHER PUBLICATIONS

Fast Inter-domain Mobility with In-packet Bloom Filters |http://delivery.acm.org/10.1145/1860000/1859987/p9-sarela.pdf?ip=151.207.250.61&id=1859987&acc=ACTIVE%20SERVICE&key=C15944E53D0ACA63%2E4D4702B0C3E38B35%2E4D4702B0C3E38B35%2E4D4702B0C3E38B35&CFID=785439718&CFTOKEN=60991748&__acm__=1463249627_8fbb1ba8b07c0dd763587389fc5e2573|Ylitalo et al|2010|pp. 9-14.*

* cited by examiner

SYSTEM AND METHOD FOR CREATING A MULTI-BRANCHED BLOCKCHAIN WITH CONFIGURABLE PROTOCOL RULES

RELATED APPLICATIONS

The present application claims priority from provisional application No. 62/029,409 entitled "System And Method For Database For Self-Actuating Contracts And Other Data" filed Jul. 25, 2014, provisional application No. 62/090,370 entitled "Use of Blockchain Database To Enhance Security of Support Secure Electronic Voting and Election Result Tabulation" filed Aug. 6, 2014, provisional application No. 62/112,130 entitled "System And Method For Blockchain-Type-Based Search Engine Database Within An Internet Browser Supporting A User Affinity Program" filed Feb. 4, 2015, provisional application No. 62/170,131 entitled "Retailer-Captive Blockchain-Derivative System For Hosting Secure and Non-Counterfeit Transactions Within A Retailer's Customer Affinity Program" filed Jun. 3, 2015, and provisional application No. 62/185,613 entitled "System And Method For Blockchain-Inspired Database Allowing Remote Access To Medical Records" filed Jun. 27, 2015, the contents of which are incorporated by reference herein in their entirety.

FIELD OF THE INVENTION

The present invention generally relates to blockchain technology. Specifically, this invention relates to creating a blockchain called a slidechain that allows for multiple valid branches or forks to propagate simultaneously with a customized set of protocol rules embedded in and applied to each fork chain that branches from another chain. The invention generally provides a computer-implemented method for accessing, developing and maintaining a decentralized database through a peer-to-peer network, to preserve the original state of data inputs while adapting to changing circumstances, user preferences, and emerging technological capabilities.

BACKGROUND OF THE INVENTION

Blockchain technology is most widely known as the technology behind the popular cryptocurrency, Bitcoin. A blockchain creates a history of data deposits, messages, or transactions in a series of blocks where each block contains a mathematical summary, called a hash, of the previous block. This creates a chain where any changes made to a block will change that block's hash, which must be recomputed and stored in the next block. This changes the hash of the next block, which must also be recomputed and so on until the end of the chain.

Although the hash, or mathematical summary, is simple to compute, there are rules imposed which require the value of the hash to be below a certain threshold value. In addition, the hash is based on a special type of mathematical function that is not reversible; you cannot predict what input can be used to produce the desired output. A valid hash is found by repeatedly adjusting a changeable value in the block, and recalculating the hash until it meets the validity requirements. The freely changeable value is called the nonce. The unpredictable nature of the hash considerably increases the difficulty of finding a nonce that produces a valid hash of the block. Typically, trillions of different nonces must be tried before a valid hash is found. Therefore, changing the value of previously stored data in the blockchain is computationally expensive, although not impossible.

The security of a blockchain is further increased by implementing it on a distributed network. This means a large number of users all have access to the blockchain and are all attempting to add blocks to the end of the chain by finding a nonce that produces a valid hash for a given block of data. When two blocks are found that both claim to reference the same previous block, a fork in the chain is created. Some users in the network will attempt to find the next block on one end of the fork while other users will work from the other end of the fork. Eventually one of the forks will surpass the other in length, and the longest chain is accepted by consensus as the valid chain. Therefore, anyone who attempts to change a block must not only re-find a valid hash for each subsequent block, but must do it faster than everyone else working on the currently accepted chain. Thus, after a certain number of blocks have been chained onto a particular block, it becomes prohibitively costly to try to change that block.

Blockchains on a distributed network with sufficiently restrictive rules for creating valid blocks are fairly secure against unauthorized changes to the data stored in them. This makes blockchains particularly useful for recording financial transactions. However, the blockchains currently in use suffer from a couple of major drawbacks. The first drawback is that the rules or protocol governing data storage and interpretation and how a blockchain is propagated and verified are set and unchangeable from the time the blockchain is first created. This means that with the rapid advancement of technology, any given blockchain can quickly become obsolete, no matter how cutting edge it was at the time of creation.

The second drawback is the inability of the blockchain to accommodate forks. Any fork that is created in the blockchain is ultimately abandoned in favor of the longest chain. Because it takes a certain amount of time, on average, for each new block to be added to a blockchain, there is a practical limit to the rate at which data can be added to the chain. The ability to accommodate forks in the chain eliminates barriers to the speed at which data can be stored and may even improve the security against modification of data.

Therefore, there is a need in the art for a system and method that allows for changes and updates to the rules or protocol governing the blockchain and its data. And there is a need in the art for a system and method that can accommodate blockchain forks, allowing each side of the fork to store valid data. These and other features and advantages of the present invention will be explained and will become obvious to one skilled in the art through the summary of the invention that follows.

SUMMARY OF THE INVENTION

Accordingly, it is an object of the present invention to provide a system and method that collects business reviews in a central database which can then be accessed by multiple external business review providers thereby enabling an efficient proliferation of those business reviews.

According to an embodiment of the present invention, a method of securely storing data in data blocks so that it cannot be modified after storage comprises the steps of: creating a root block payload to be included as part of a root block, wherein a root block comprises the root block payload and a root header; computing a root data hash from at least part of the root block payload; creating the root header comprising at least the root data hash, a root timestamp, a root cryptographic nonce, a root proof standard, and a root data descriptor; computing a short hash from inputs of at least said root data hash, said root timestamp, said root proof standard, and said root data descriptor, but excluding said cryptographic nonce, and a fork header hash of a fork block; storing data as a fork block payload to be included as part of the fork block, wherein said fork block comprises a fork block payload, a fork header, and one or more authorized fork hashes; computing a payload hash from at least part of the fork block payload; creating a fork block header comprising at least said payload hash, a previous block hash, a payload timestamp, a payload cryptographic nonce, a payload proof standard, a fork block flag, and a payload data descriptor; storing said short hash in said fork block as said one or more authorized fork hashes; computing the fork header hash from inputs of at least said one or more authorized fork hashes, said payload hash, said previous block hash, said payload timestamp, said payload cryptographic nonce, said payload proof standard, said fork block flag, said payload data descriptor; storing said fork header hash as part of said root header; computing a root header hash from inputs of at least said root data hash, said root timestamp, said root proof standard, said root data descriptor, said root cryptographic nonce, and said fork header hash;

According to an embodiment of the present invention, the method further comprises the steps of: creating a slide chain rule set describing computer readable instructions for interpreting and/or parsing data stored in data blocks; storing said slide chain rule set as said root block payload.

According to an embodiment of the present invention, the method further comprises the steps of: creating a slide chain rule set describing computer readable instructions for interpreting and/or parsing data stored in data blocks; storing said slide chain rule set as said fork block payload.

According to an embodiment of the present invention, the method of claim comprises the steps of: creating a slide chain rule set describing computer readable instructions for verifying the validity of data blocks; and storing said slide chain rule set as said root block payload.

According to an embodiment of the present invention, the method further comprises the steps of: creating a slide chain rule set describing computer readable instructions for verifying the validity of data blocks; and storing said slide chain rule set as said fork block payload.

According to an embodiment of the present invention, a system for securely storing data in data blocks so that it cannot be modified after storage comprises: a processor; a non-volatile computer memory storing computer readable instructions configured to: create a root block payload to be included as part of a root block, wherein a root block comprises the root block payload and a root header; compute a root data hash from at least part of the root block payload; create the root header comprising at least the root data hash, a root timestamp, a root cryptographic nonce, a root proof standard, and a root data descriptor; compute a short hash from inputs of at least said root data hash, said root timestamp, said root proof standard, and said root data descriptor, but excluding said cryptographic nonce, and a fork header hash of a fork block; store data as a fork block payload to be included as part of the fork block, wherein said fork block comprises a fork block payload, a fork header, and one or more authorized fork hashes; compute a payload hash from at least part of the fork block payload; create a fork block header comprising at least said payload hash, a previous block hash, a payload timestamp, a payload cryptographic nonce, a payload proof standard, a fork block flag, and a payload data descriptor; store said short hash in said fork block as said one or more authorized fork hashes; compute the fork header hash from inputs of at least said one or more authorized fork hashes, said payload hash, said previous block hash, said payload timestamp, said payload cryptographic nonce, said payload proof standard, said fork block flag, said payload data descriptor; store said fork header hash as part of said root header; compute a root header hash from inputs of at least said root data hash, said root timestamp, said root proof standard, said root data descriptor, said root cryptographic nonce, and said fork header hash.

According to an embodiment of the present invention, said computer readable instructions are further configured to: create a slide chain rule set describing computer readable instructions for interpreting and/or parsing data stored in data blocks; and store said slide chain rule set as said root block payload.

According to an embodiment of the present invention, said computer readable instructions are further configured to: create a slide chain rule set describing computer readable instructions for interpreting and/or parsing data stored in data blocks; store said slide chain rule set as said fork block payload.

According to an embodiment of the present invention, said computer readable instructions are further configured to: create a slide chain rule set describing computer readable instructions for verifying the validity of data blocks; store said slide chain rule set as said root block payload.

According to an embodiment of the present invention, said computer readable instructions are further configured to: create a slide chain rule set describing computer readable instructions for verifying the validity of data blocks; and store said slide chain rule set as said fork block payload.

The foregoing summary of the present invention with the preferred embodiments should not be construed to limit the scope of the invention. It should be understood and obvious to one skilled in the art that the embodiments of the invention thus described may be further modified without departing from the spirit and scope of the invention.

DETAILED SPECIFICATION

The present invention generally relates to blockchain technology. Specifically, this invention relates to creating a blockchain called a slidechain that allows for multiple valid branches or forks to propagate simultaneously with a customized set of protocol rules embedded in and applied to each fork chain that branches from another chain. The invention generally provides a computer-implemented method for accessing, developing and maintaining a decentralized database through a peer-to-peer network, to preserve the original state of data inputs while adapting to changing circumstances, user preferences, and emerging technological capabilities.

The slidechain makes two primary improvements over the blockchain. The first improvement is the ability to accept modification to the protocols or rules that apply to a blockchain, for example, rules that govern how data is stored and interpreted, how block validity is verified, how valid chain consensus is achieved, criteria for generating a new block, etc. This allows the slidechain to adapt to new requirements, demands, or technological applications as they arise without having to start an entirely new blockchain.

The second improvement is the ability to handle multiple valid forks of the blockchain. This allows much more data to be stored in the blockchain at a much higher rate. This also improves the security of the slidechain; each time a valid fork is made, the blocks up-chain become more difficult to modify because the changes must propagate down-chain through an additional blockchain beyond what already existed before the fork. Each fork is capable of forking yet again, allowing for near infinite possible permutations of chain structure. The details of these and other features will be explained further below with reference to the various figures.

Figure 1:
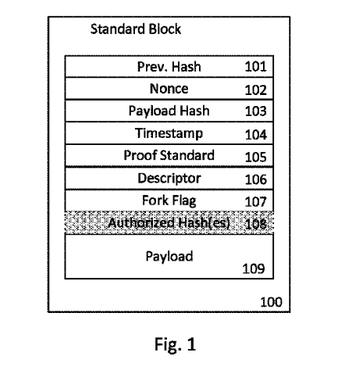
FIG. 1 is a diagram of a slidechain with a forked chain that has a different set of rules applied to it than the original blockchain according to an embodiment of the present invention.

According to an embodiment of the present invention, FIG. 1 shows the data structure for a standard block of data in the slide chain. Previous hash 101 is the result of a non-reversible mathematical computation using data from the previous block as the input. According to one embodiment the computation used is a SHA256 hash function. One of ordinary skill in the art would recognize that any suitable hash function could be used without departing from the spirit and scope of the present invention. The hash function is designed so that any change to the data in the previous block results in an unpredictable change in the hash of that block. Previous hash 101 is what creates the link between blocks, chaining them together to form the slidechain.

When calculating the hash 101 for the previous block, it must meet certain criteria defined by data stored as the proof standard 105. In one embodiment, this proof standard 105 is simply a number that the calculated hash must be less than. However, because the output of the hashing function is unpredictable, it cannot be determined, before the hash is calculated, what input will result in an output that is less than the proof standard 105. The nonce 102 is used to vary the data content of the block, allowing for a large number of different outputs to be produced by the hash function in pursuit of an output that meets the proof standard 105. This makes it computationally expensive to produce a valid block with a nonce 101 that produces a hash value meeting the criteria of the proof standard 105.

The payload hash 103 is a simple hash of the data in the payload 109 and does not have to meet any proof standard. However, the payload hash is included as part of the input when the hash is calculated for the purpose of storing as the previous hash 101 of the next block. The timestamp 104 tells what time the block was created within a certain range of error. According to one embodiment of the present invention, the distributed network of users checks the timestamp 104 against their own known time and will reject any block that seems to have a bogus timestamp 104. The descriptor 106 describes the size and/or data structure of the payload 109. For a variable size payload 109, the descriptor 106 may indicate the index of the first byte in the payload 109 and the size of the payload 109. The descriptor 106 may also store other information relevant to the interpretation of the payload 109.

The fork flag 107 is an indicator used to determine whether a fork is allowed from this block. The authorized hashes 108 indicate which blocks, identified by a hash, are allowed to chain off of this block. According to one embodiment, the authorized hashes 108 are only stored as part of the block if the fork flag 107 is set. In another embodiment, a single authorized hash 108 is present regardless of whether the fork flag 107 is set, but the authorized hash 108 data may be zeroed out or ignored when the fork flag 107 is not set. According to another embodiment, the number of hashes stored as authorized hashes 108 is flexible. The number of authorized hashes 108 stored may be tracked in the descriptor 106, or a flexible data structure for storing authorized hashes 108 may be used to store a variable number of authorized hashes 108.

The payload 109 is the data stored in the block, which may relate to voting, transactions, ownership, data access records, document versioning, or any kind of data that can be stored. The payload 109 may be a fixed size or a flexible size, and provides the input for the hash that produces the payload hash.

One of ordinary skill in the art would recognize there are a variety of different proof standards that could be used. The proof standard could be based on proof of work, such as hash value requirements, proof of stake, such as a key or other indicator of consensus, or any other kind or proof of consensus. The proof standard may be applied as a rule that requires a hash value to be less than the proof standard, more than the proof standard, or have a required bit sequence or a required number of leading or trailing zeroes. Any proof standard may be used without departing from the spirit and scope of the present invention.

The hash algorithms used for the previous hash 101, the payload hash 103, or the authorized hash may be all of the same type or of different types. Hash functions that could be used include MD5, SHA-1, SHA-224, SHA-256, SHA-384, SHA-512, SHA-512/224, SHA-512/256, SHA-3 or any suitable hash function resistant to pre-image attacks. There is also no requirement that a hash be computed only once. The results of a hash function may be reused as inputs into another or the same hash function again multiple times in order to produce a final result. One of ordinary skill in the art would recognize that any hash function could be used to compute the required hashing without departing from the spirit and scope of the present invention.

Figure 2:
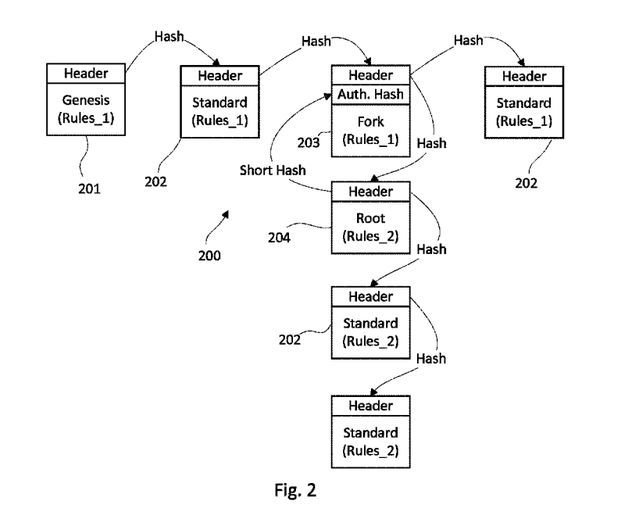
FIG. 2 is a diagram of a slidechain with multiple forks where each new chain has a different protocol or set of rules that apply according to an embodiment of the present invention.

FIG. 2 shows a simple diagram illustrating a slidechain 200 with a single fork. The genesis block 201 is a special block that begins the slidechain 200; it is different from the other blocks because it is the first block in the chain, and thus cannot include a hash of a previous block. The genesis block 201 marks the beginning of the genesis chain. The protocol, that governs how the genesis chain grows, what data it stores, how forks are created, and how block and chain validity are verified is indicated by the Rules_1 label inside each block in the genesis chain. The Rules_1 protocol is the default set of rules that allows for the creation of forks and the modification of rules in those forks. Notice that the Rules_1 protocol still applies to blocks in the genesis chain even after a fork block 203 creates a fork chain where the Rules_2 protocol applies.

The fork block 203 allows the chain to be forked such that both the genesis chain and the fork chain are considered valid chains. Normally, in a blockchain, all forks are eventually ignored and considered invalid except the one representing the longest chain. The fork block 203 is special because it works like a standard block, but additionally includes a reference identifying the first block, or root block 204, in the valid fork. In one embodiment of the present invention, the new protocol, Rules_2, is stored as the payload of the fork block and applied to the root block 204 and each subsequent standard block that chains from the root block 204. In another embodiment, the new Rules_2 protocol is stored in the payload of the root block 204 itself, and is applied to each standard block that chains from the root block 204. In either case, any subsequent block that is chained from either the genesis chain, where Rules_1 applies, or the fork chain, where Rules_2 applies, can be another fork block creating yet another valid chain fork.

The Rules_1, Rules_2, and other protocols are not defined by this specification, but defined by users of the system at runtime. These protocols are customizable based on a scripting, or programming language. According to one embodiment, a new protocol can only be defined for a forked chain and the original protocol remains fixed and applied to the genesis chain. In another embodiment, the genesis chain protocol itself can be modified or updated and applied to every future standard block that chains off the genesis chain. This new base protocol would ideally be backwards compatible with the original genesis chain protocol so that all previous data is not rendered obsolete. The ability to update the protocol and create new protocols gives slidechain the flexibility to adapt to any future technological need where a blockchain is useful.

Figure 3:
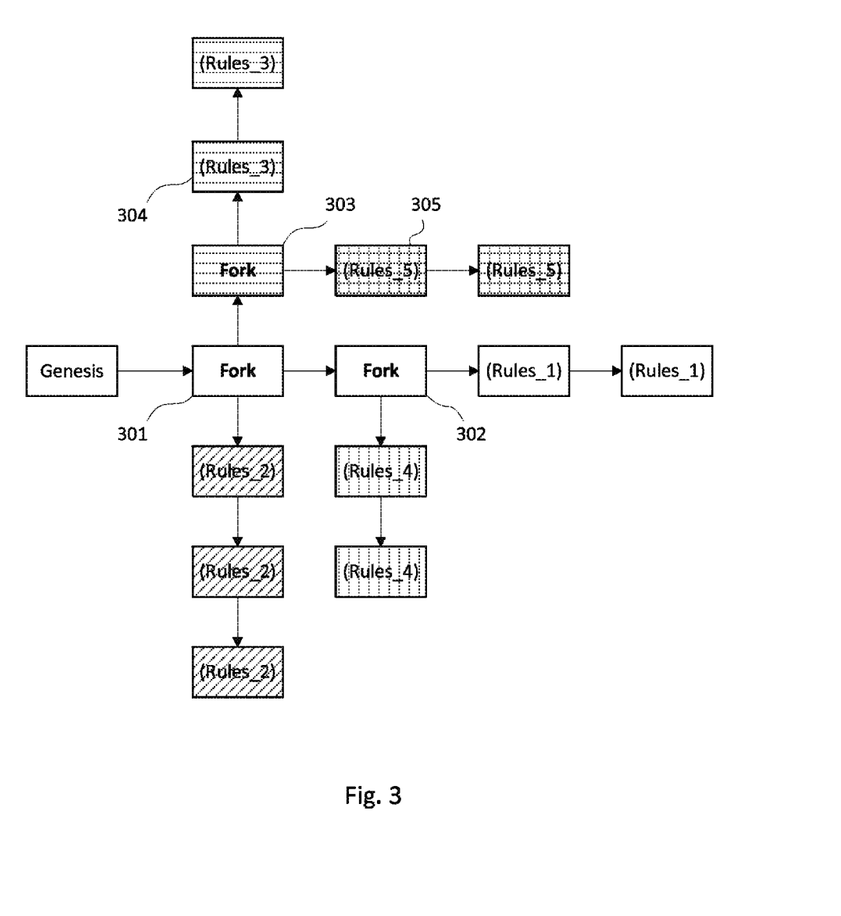
FIG. 3 is a diagram illustrating how a fork block interconnects with the root block of a forked chain according to one embodiment of the present invention.

According to an embodiment of the present invention shown in FIG. 3, the slidechain can have multiple forks. Each forked chain is pattern coded in FIG. 3 to visually indicate that the same protocol rules apply to blocks with the same pattern fill. The genesis chain, including the genesis block is filled with plain white. Two consecutive fork blocks, 301 and 302, are shown on the genesis chain. The first fork block 301 begins a forked chain that applies the Rules_2 protocol. The second fork block 302 immediately following the first fork block creates a new forked chain that applies a different Rules_4 protocol. There is no limit to the number of fork blocks or the frequency of fork blocks in the genesis chain. According to one embodiment of the present invention, every block in the genesis chain could conceivably be a fork block. However, it is possible for the protocol of a forked chain to impose its own rules for the creation of additional fork blocks on that forked chain. If a chain that does not recognize the validity of multiple branches is required for a particular application, a customized protocol that disallows forking can be created.

According to an embodiment of the present invention, a forked block may allow for more than one fork to chain from it. The first fork block 301 illustrates this with a fork chain applying Rules_2 attached beneath it and the fork chain applying Rules_3 chaining above it. In order for a fork block to allow for multiple forks, it must store a reference to the root block for each chain that chains from it. This requires a section in the block for authorized hashes that can store more than one authorized has corresponding to a root block. According to one embodiment of the present invention, the protocol rules for each chain are stored in the root block of each forked chain, and not the fork block itself. In another embodiment, the protocol rules for multiple forks are stored in the fork block itself, with an identifier that references the root block to which the protocol rules apply.

According to an embodiment of the present invention, the first block in a forked chain may also be a fork block itself. This is illustrated in FIG. 3 by the third fork block 303. The first fork block 301 creates a forked chain with a Rules_3 protocol and the third fork block 301, which is the first block in the Rules_3 chain, is also a fork block creating a forked chain to the right with a Rules_5 protocol. According to one embodiment of the present invention, the chain rule set for each chain is stored in the first block of the chain fork. Therefore, the Rules_3 protocol would be stored in the third fork block 303 and the Rules_5 protocol is stored in the root block 305. According to another embodiment of the present invention, the fork block stores the protocol rules for the forked chain. In this embodiment, the first fork block 301 would store the Rules_3 protocol and the thirds fork block 303 stores the Rules_5 protocol.

The language used for defining the protocol rules for a forked chain at runtime can be a known computer programming or scripting language, such as, Python, Ruby, Perl, JavaScript, PHP, Scheme, VBScript, Java, Microsoft .Net, C++, C#, C, or a custom-created language for defining the protocol rules. One of ordinary skill in the art would recognize that any suitable language can be used for defining runtime protocols for forked chains without departing from the spirit and scope of the present invention.

Under normal circumstances, blockchains naturally fork from time to time. However, only one branch of the chain in a standard blockchain can be considered valid. Consensus on which chain is valid is achieved by choosing the longest chain, which represents the chain with the most work put into completing it. In order to allow for forked chains without allowing accidental forks in the chain, there must be some mechanism by which valid forks can be verified, and invalid forks can be ignored.

Figure 4:
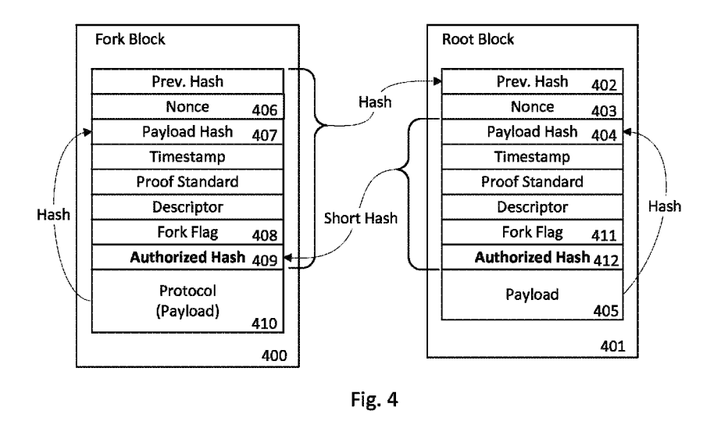
FIG. 4 is a diagram illustrating how a standard block becomes a fork block and interconnects with the first block, or root block of a forked chain according to one embodiment of the present invention.

FIG. 4 illustrates how the fork block 400 is interconnected with the first block in an intentional fork to create a valid fork chain. Each block in the blockchain contains a hash of the immediately preceding block stored in the previous hash 402. This creates a link going back through the chain from each block and is a key component to making it prohibitively difficult to modify the chain. The first block in a valid intentional fork is called the root block 401. Therefore the root block 401 naturally contains in its previous hash 402 a link to the fork block 400. In order to distinguish valid intentional forks from invalid unintentional forks, a hash representing the root block 401 is also stored in the fork block 400. This creates a two way link where the fork block 400 and the root block 401 each contain a hash reference to the other.

According to an embodiment of the present invention, the root block 401 is partially created before the fork block 400 is created. The previous hash 402, which will come from the fork block 400, and the nonce 403 are left unspecified at this point. A payload hash 404 is created from the data stored in the payload 405. The payload hash 404 and all the data of the root block 401, except the previous hash 402 and the nonce 403, are used to compute a short hash, which is stored as the authorized hash 409 of the fork block 400. Excluding the previous hash 402 from the short hash prevents the situation of having mutually dependent hashes with no known way to find a solution. Excluding the nonce 403 is required because the nonce 403 will later be changed in determining a valid hash for the root block 401 after the previous hash 402 is determined from the fork block 400, which does not yet exist at this point.

According to one embodiment of the present invention, the protocol 410 rules that apply to the fork chain beginning with the root block 401 are stored in the fork block payload. A hash is then computed based on the payload and stored as the payload hash 407. The fork flag 408 is set in the fork block to indicate a valid fork branching from the fork block 400. The authorized hash 409, which represents the root block 401, is included along with the payload hash 407 and the rest of the fork block data in computing a valid hash for the fork block 400. This is done by repeatedly adjusting the fork block nonce 406 until the resulting hash meets the required proof standard.

Once the fork block hash is computed and stored as the previous hash 402 of the root block, a valid root block hash can then be computed by repeatedly adjusting the root block nonce 403 until a hash is produced that meets the required proof standard. Because the previous hash 402 and the nonce 403 of the root block are not included in the short hash, they can safely be modified without changing the authorized hash 409 in the fork block 400. However, any changes to the data used to compute the short hash will cause a mismatch between the short hash and the authorized hash stored in the fork block 400, breaking the link between the fork block 400 and the root block 401.

According to an embodiment of the present invention, additional rules are imposed to prevent unauthorized forks from being recognized. For example, somebody might try to make an exact copy of the root block in order to fake an authorized fork. However, the system is configured to ignore exact copies of blocks and treat them as the same block. Exact copies can be detected by comparing the block hash or the short hash between two blocks that both reference the same previous block. The block hash is based at least on the previous hash, nonce, payload hash, timestamp, proof standard, descriptor, fork flag, and optionally the authorized hash, when present. Any blocks that try to chain off the copy of the root block are simply treated as chaining off the original root block, creating a fork that is indistinguishable from an unauthorized fork. In dealing with unauthorized forks, the longest chain is considered valid.

According to an embodiment of the present invention, the root block may also be a fork block. This is called a root fork. If the fork flag 411 in the root block 401 is set, then an authorized hash is stored identifying a second root block that begins a valid fork. When a root block is a fork block, the second root block must be created first. The short hash of the second root block is stored as the authorized hash 412 in the root fork block. The root fork short hash can then be computed and stored as the authorized hash 409 of the fork block 400. Once the fork block is created, the block hashes for the fork block, the root fork block, and the second root block can then be computed in the required order, as described above.

Figure 5:
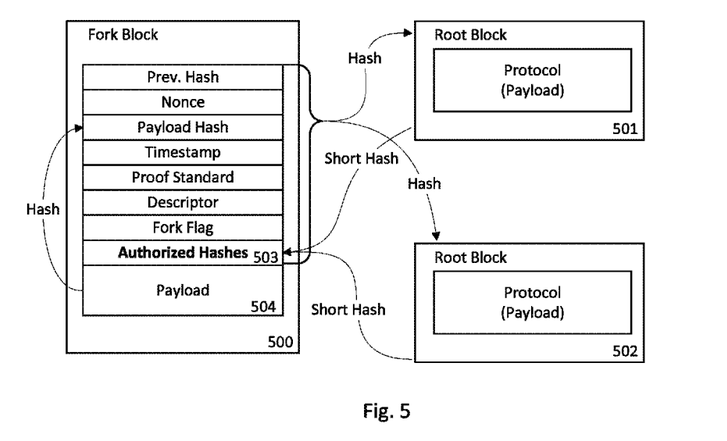
FIG. 5 is a flowchart showing the process for creating a fork in the slide chain according to an embodiment of the present invention.

According to an embodiment of the present invention shown in FIG. 5, a fork block 500 may store more than one authorized hash to create multiple authorized forks from a single fork block 500. The authorized hashes 502 are stored in a flexible structure that allows storage of one or more short hashes corresponding to one or more root blocks. The protocol rules for each valid fork may be stored in the fork block payload 504, or in the root blocks 501 and 502 for each authorized fork chain respectively.

When a slidechain forks, the authorized root block referenced in the fork block represents one side of the fork. The other side of the fork is determined by the standard rule for a blockchain, where the longest blockchain is considered the valid chain and all other forks are abandoned. For example there may be three blocks that all reference a fork block as their previous hashes. The root block which has a short hash that matches the authorized hash in the fork block is automatically recognized as valid regardless of how long the chain from that root block is. Between the remaining two chains, the longest chain is considered the second valid chain and the shorter chain is abandoned by the distributed network.

Figure 6:
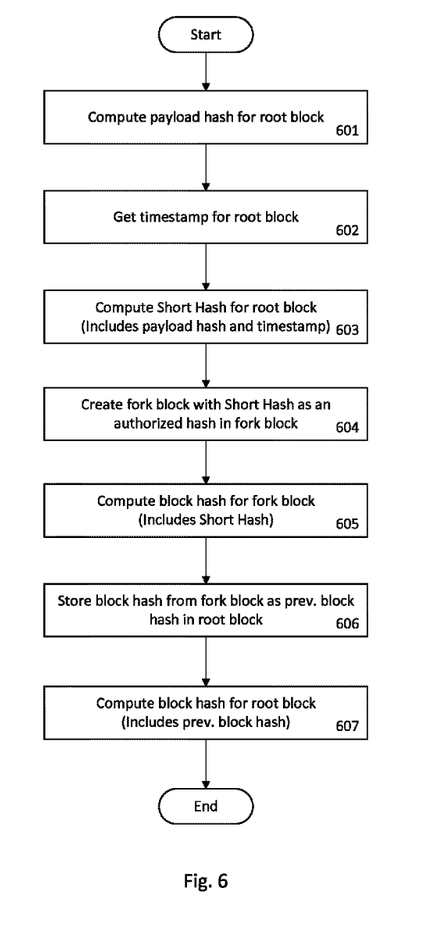
FIG. 6 is a flowchart showing the process for verifying the slidechain according to an embodiment of the present invention.

According to an embodiment of the present invention, FIG. 6 shows a flowchart for the process of creating a valid slidechain fork. At step 601, the system computes the payload has for the root block. The payload hash is a mathematical summary of the payload data and does not have to meet any proof standard. At step 602 the system gets a timestamp for the root block. The distributed network follows rules for accepting new blocks that require the timestamp to be within a certain range. A timestamp that appears to be spoofed or faked will result in rejection of the root block by the distributed network.

At step 603, the short hash is computed. The short hash uses at least the payload hash and timestamp as inputs, and may include other parts of the block as well. Including more parts of the block in the short hash improves the reliability and security of the slidechain by making it more difficult to spoof an apparently authorized chain fork. At step 604, the fork block is created with the short hash from the root block stored as the authorized hash in the fork block. At step 605, the block hash for the fork block is computed. The block hash must meet the proof standard stored in the fork block. This is accomplished by repeatedly adjusting the nonce until a hash is found that meets the proof standard.

At step 606, the block hash from the fork block is stored as the previous hash in the root block. This completes the two-way reference between the fork block and the root block, ensuring that the root block represents an authorized and valid fork from the fork block. At step 607, the root block is validated or finalized by finding a block hash that meets the proof standard stored in the root block.

Figure 7:
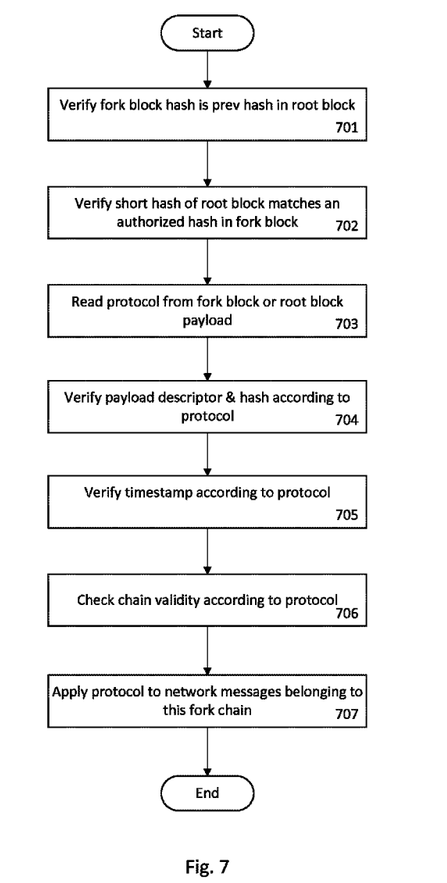

FIG. 7 shows a flowchart of a process for verifying the integrity and validity of a slidechain fork. At step 701, when a fork block is found, indicated by a block with the fork flag set, the system reads the fork block and checks to see if the root block contains the fork block has as the root block's previous hash. At step 702, the system verifies that the short hash of the root block matches an authorized hash stored in the fork block.

At step 703, the system reads the protocol from the payload of the fork block or the root block. If the slidechain stores fork chain protocols in the fork block, the system reads the protocol from the fork block. If the slidechain stores the fork chain protocols in the root block, the system reads the protocol from the root block. At step 704, the system verifies the descriptor and the payload hash according to the rules specified in the protocol. At step, 705, the system verifies that the timestamp meets the requirements specified by the protocol. This usually involves averaging the timestamps of a number of blocks that precede the root block and verifying that the timestamp is within a certain range of that average timestamp.

At step 706, the system checks the validity of the subsequent blocks on this fork chain according to the rules of the protocol read from the beginning of the fork chain. The protocol may also define rules for how network messages corresponding to this fork chain are to be sent. Therefore, in step 707, the system applies the protocol to the network messages belonging to this fork chain. This may include determining which network messages belong to this fork chain based on rules in the protocol for identifying relevant network messages.

The steps shown in the flowcharts need not be executed in the order described. One of ordinary skill in the art would recognize that the order of certain steps can be rearranged without departing from the spirit and scope of the present invention.

Practical Applications of Slidechain Technology

One application of slidechain technology is in creating automatically executing conditional payment agreements. This is done by creating a fork with a specific protocol designed to automatically enforce a contractual agreement. For example, an automatic escrow service may be set up to receive digital funds and hold them until proof of fulfilling a contractual obligation is submitted to the slidechain and stored on the forked chain that corresponds to the contractual agreement. The proof may be a cryptographic key that represents a customer or business having signed for the delivery of goods. When this key is verified by through the protocol that applies to the fork chain, the funds will be automatically released to the contracting party.

This type of automatically executing conditional payment agreement can also be used to manage certain prize contests with little or no human intervention. A fork chain can be created with a protocol that verifies the correctness of a solution to a problem. When a valid solution is provided, the prize is automatically released to the address of the one who submitted the valid entry. The prize may be digital currency, a key that is redeemable for goods or services, or even a job offer.

A fork chain can also be created to automatically manage the payment of royalties related to an intellectual property licensing agreement. For example a system may be set up that reports to the slidechain each time a song is played or a digital book is provided, or a film is viewed. The slidechain can be programmed to automatically send payments of digital currency that correspond to accessing the intellectual property media.

Slidechain can also be used to enable smart contracts. The phrase "smart contract" is often misinterpreted or used inaccurately. The essence of the contract will not change, as the contract is not the problem but rather the symptom. Rather, the "smart contract" phrase should refer to the "smart" decision as to whether to enter a contract. The slidechain invention can enable information verification to assist and become an integral part of an informed "smart" decision about entering a contract. A smart contract is not only an irreversible contract but also one where reliance on knowledge of facts can replace reliance on hope and trust. Contracting parties can replace "trust" with "knowledge" of either performance or the ability to pay. If desired, parties to a smart contract in slidechain may choose reversal procedures or breach resolution procedures. These would be defined before entering into said contracts. Additionally, a smart contract may be modifiable if terms agreed to by the parties are met. Slidechain will offer the flexibility to define these terms if and when they are needed or desirable in the context of a given agreement. All of these features will be programmable, and form a central component of slidechain's enhanced utility. Certifications and written assurances of willingness to perform, to pay, a contract obligation will be replaced by actual, independently verifiable proof of such ability, with irreversibility negating the question of a party's willingness to pay (and implicitly, its willingness and ability to breach a contract regardless of its terms or complexity). In so doing the slidechain system and method will deter and repel contract parties who seek to gain advantage through nonperformance, double-dealing and other methods of dishonesty, and thus clear the field for honest commercial parties who wish to engage in business with a minimum of third-party interference or rent-seekers.

One example of how this works is the transfer of assets, such as real estate. Slidechain can be used to register ownership of real property using a unique identifier for the property that is stored on the slidechain along with the owner and any historical transfers of ownership. The data in the slidechain can then be verified to determine whether the seller of a piece of real property is actually the owner as he claims, and that he has not recently also sold the property to another person. Transfer of funds to complete the purchase can be withheld until the slidechain is updated with a successful transfer of ownership to the purchasing party, at which point, the slidechain protocol can automatically release funds when the transfer of the asset is completed and validated.

Slidechain can also be used to offer secure electronic counting of votes. This is done through the following process. A voter's identity is first authenticated through whatever means are required by law. The voter is then assigned a cryptographic private key and allowed to enter votes. Votes may be entered using a paper ballot identified with the private key, or the private key may be given to the voter by paper or electronic means and the voter enters votes electronically. In the case of a paper ballot, the ballot, and its private key, is then scanned to enter the votes into a computer system. The votes are then signed using the private key and stored on the slidechain. In the case of electronic voting, the voter enters the votes into the computer and uses the private key to sign the electronic ballot, which is then stored on the slidechain. The slidechain may use various fork chains to cover different districts, or regions, different elections, or to implement different verification rules by state or municipality depending on varying laws in those municipalities. Once the votes are stored on the slidechain, they become very difficult to change or falsify.

Another use for the slidechain is in implementing a browser rewards program, customer affinity program, or the storage of medical records. In each of these applications, there are information providers and information consumers. In order to incentivize information providers to submit information to the slidechain database, rewards are given to users for providing information. The reward can be a digital currency, rewards points, or any rewards benefits, such as free items or discounts, that are commonly used in rewards programs. The digital currency or rewards points transactions can be securely tracked to prevent double spending, or corruption of data. Information consumers, such as business, provide the rewards points or money payments required to fund the system. These payments are the source of rewards for those that provide data to the database. Multiple rewards programs can be implemented on the same slidechain using the programmable protocol to define the rules that apply for each rewards program. Customer-specific rewards programs can also be created using the slidechain where each fork represents a different customer with a unique protocol defining the specific rewards tailored to that customer.

With hospital records, a separate fork chain can be dedicated to each patient, or each hospital. Slidechain can provide a closed economy for patient health information. A digital medical currency can be created, much like bitcoin, where doctors, nurses, or hospitals get paid small amounts of the currency for each block of information that is provided to the data base, or for providing the computing power necessary to solve for new blocks. This currency is then spent on accessing the database to read patient information. This system incentivizes more disclosure of patient information to the database because the currency that is provided is required to access the database later.

Traditionally, a computer program consists of a finite sequence of computational instructions or program instructions. It will be appreciated that a programmable apparatus (i.e., computing device) can receive such a computer program and, by processing the computational instructions thereof, produce a further technical effect.

A programmable apparatus includes one or more microprocessors, microcontrollers, embedded microcontrollers, programmable digital signal processors, programmable devices, programmable gate arrays, programmable array logic, memory devices, application specific integrated circuits, or the like, which can be suitably employed or configured to process computer program instructions, execute computer logic, store computer data, and so on. Throughout this disclosure and elsewhere a computer can include any and all suitable combinations of a special-purpose computer, programmable data processing apparatus, processor, processor architecture, and so on.

It will be understood that a computer can include a computer-readable storage medium and that this medium may be internal or external, removable and replaceable, or fixed. It will also be understood that a computer can include a Basic Input/Output System (BIOS), firmware, an operating system, a database, or the like that can include, interface with, or support the software and hardware described herein.

Embodiments of the system as described herein are not limited to applications involving conventional computer programs or programmable apparatuses that run them. It is contemplated, for example, that embodiments of the invention as claimed herein could include an optical computer, quantum computer, analog computer, or the like.

Regardless of the type of computer program or computer involved, a computer program can be loaded onto a computer to produce a particular machine that can perform any and all of the depicted functions. This particular machine provides a means for carrying out any and all of the depicted functions.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

According to an embodiment of the present invention, a data store may be comprised of one or more of a database, file storage system, relational data storage system or any other data system or structure configured to store data, preferably in a relational manner. In a preferred embodiment of the present invention, the data store may be a relational database, working in conjunction with a relational database management system (RDBMS) for receiving, processing and storing data. In the preferred embodiment, the data store may comprise one or more databases for storing information related to the processing of moving information and estimate information as well one or more databases configured for storage and retrieval of moving information and estimate information.

Computer program instructions can be stored in a computer-readable memory capable of directing a computer or other programmable data processing apparatus to function in a particular manner. The instructions stored in the computer-readable memory constitute an article of manufacture including computer-readable instructions for implementing any and all of the depicted functions.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

The elements depicted in flowchart illustrations and block diagrams throughout the figures imply logical boundaries between the elements. However, according to software or hardware engineering practices, the depicted elements and the functions thereof may be implemented as parts of a monolithic software structure, as standalone software modules, or as modules that employ external routines, code, services, and so forth, or any combination of these. All such implementations are within the scope of the present disclosure.

In view of the foregoing, it will now be appreciated that elements of the block diagrams and flowchart illustrations support combinations of means for performing the specified functions, combinations of steps for performing the specified functions, program instruction means for performing the specified functions, and so on.

It will be appreciated that computer program instructions may include computer executable code. A variety of languages for expressing computer program instructions are possible, including without limitation C, C++, Java, JavaScript, assembly language, Lisp, HTML, Perl, and so on. Such languages may include assembly languages, hardware description languages, database programming languages, functional programming languages, imperative programming languages, and so on. In some embodiments, computer program instructions can be stored, compiled, or interpreted to run on a computer, a programmable data processing apparatus, a heterogeneous combination of processors or processor architectures, and so on. Without limitation, embodiments of the system as described herein can take the form of web-based computer software, which includes client/server software, software-as-a-service, peer-to-peer software, or the like.

In some embodiments, a computer enables execution of computer program instructions including multiple programs or threads. The multiple programs or threads may be processed more or less simultaneously to enhance utilization of the processor and to facilitate substantially simultaneous functions. By way of implementation, any and all methods, program codes, program instructions, and the like described herein may be implemented in one or more thread. The thread can spawn other threads, which can themselves have assigned priorities associated with them. In some embodiments, a computer can process these threads based on priority or any other order based on instructions provided in the program code.

Unless explicitly stated or otherwise clear from the context, the verbs "execute" and "process" are used interchangeably to indicate execute, process, interpret, compile, assemble, link, load, any and all combinations of the foregoing, or the like. Therefore, embodiments that execute or process computer program instructions, computer-executable code, or the like can suitably act upon the instructions or code in any and all of the ways just described.

The functions and operations presented herein are not inherently related to any particular computer or other apparatus. It is possible to modify or customize general-purpose systems to be used with programs in accordance with the teachings herein, or it may prove convenient to construct more specialized apparatus to perform the required method steps. The required structure for a variety of these systems will be apparent to those of skill in the art, along with equivalent variations. In addition, embodiments of the invention are not described with reference to any particular programming language. It is appreciated that a variety of programming languages may be used to implement the present teachings as described herein, and any references to specific languages are provided for disclosure of enablement and best mode of embodiments of the invention. Embodiments of the invention are well suited to a wide variety of computer network systems over numerous topologies. Within this field, the configuration and management of large networks include storage devices and computers that are communicatively coupled to dissimilar computers and storage devices over a network, such as the Internet.

Throughout this disclosure and elsewhere, block diagrams and flowchart illustrations depict methods, apparatuses (i.e., systems), and computer program products. Each element of the block diagrams and flowchart illustrations, as well as each respective combination of elements in the block diagrams and flowchart illustrations, illustrates a function of the methods, apparatuses, and computer program products. Any and all such functions ("depicted functions") can be implemented by computer program instructions; by special-purpose, hardware-based computer systems; by combinations of special purpose hardware and computer instructions; by combinations of general purpose hardware specialized through computer instructions; and so on—any and all of which may be generally referred to herein as a "circuit," "module," or "system."

While the foregoing drawings and description set forth functional aspects of the disclosed systems, no particular arrangement of software for implementing these functional aspects should be inferred from these descriptions unless explicitly stated or otherwise clear from the context.

Each element in flowchart illustrations may depict a step, or group of steps, of a computer-implemented method. Further, each step may contain one or more sub-steps. For the purpose of illustration, these steps (as well as any and all other steps identified and described above) are presented in order. It will be understood that an embodiment can contain an alternate order of the steps adapted to a particular application of a technique disclosed herein. All such variations and modifications are intended to fall within the scope of this disclosure. The depiction and description of steps in any particular order is not intended to exclude embodiments having the steps in a different order, unless required by a particular application, explicitly stated, or otherwise clear from the context.

The functions, systems and methods herein described could be utilized and presented in a multitude of languages. Individual systems may be presented in one or more languages and the language may be changed with ease at any point in the process or methods described above. One of ordinary skill in the art would appreciate that there are numerous languages the system could be provided in, and embodiments of the present invention are contemplated for use with any language.

While multiple embodiments are disclosed, still other embodiments of the present invention will become apparent to those skilled in the art from this detailed description. The invention is capable of myriad modifications in various obvious aspects, all without departing from the spirit and scope of the present invention. Accordingly, the drawings and descriptions are to be regarded as illustrative in nature and not restrictive.

The invention claimed is:

1. A method of securely storing data across a network in a multi-dimensional distributed database, said method comprising the steps of:

generating a blockchain comprising linked data blocks, said blockchain being configured to propagate one or more branching blockchains, wherein any existing branching blockchain is configured to propagate one or more additional branching blockchains, wherein each of said branching blockchains has a fork block from which said one or more branching blockchains can grow in multiple directions thereby forming a multi-dimensional database known as a slidechain, wherein said growth occurs by adding new data blocks awarded each time a participating node in the network propagates an acceptable block with corresponding block hash, said fork block comprising a customizable set of protocols that define, for each block in said branching blockchain at least how block data is stored and interpreted, how block validity is verified, how valid chain consensus is achieved, and criteria for generating a new block, wherein a copy of said slidechain is distributed to every node in the network, and said one or more new blocks are propagated when a node in the network provides a valid response to an algorithm along with proof of work for the valid response, wherein data stored in a block cannot be modified without invalidating all subsequent blocks, wherein generating said blockchain or branching blockchain includes:

creating a root block payload to be included as part of a root block, wherein a root block comprises the root block payload and a root header, computing a root data hash from at least part of the root block payload;

creating the root header comprising at least the root data hash, a root timestamp, a root cryptographic nonce, a root proof standard, and a root data descriptor;

computing a short hash from inputs of at least said root data hash, said root timestamp, said root proof standard, and said root data descriptor;

storing data as a fork block payload to be included as part of the fork block, wherein said fork block comprises a fork block payload, a fork header, and one or more authorized fork hashes;

computing a payload hash from at least part of the fork block payload;

creating a fork block header comprising at least said payload hash, a previous block hash, a payload timestamp, a payload cryptographic nonce, a payload proof standard, a fork block flag, and a payload data descriptor;

storing said short hash in said fork block as said one or more authorized fork hashes;

computing the fork header hash from inputs of at least said one or more authorized fork hashes, said payload hash, said previous block hash, said payload timestamp, said payload cryptographic nonce, said payload proof standard, said fork block flag, said payload data descriptor;

storing said fork header hash as part of said root header; and computing a root header hash from inputs of at least said root data hash, said root timestamp, said root proof standard, said root data descriptor, said root cryptographic nonce, and said fork header hash.

2. The method of claim 1 further comprising the steps of:
creating a slide chain rule set describing computer readable instructions for interpreting and/or parsing data stored in data blocks; and
storing said slide chain rule set as said root block payload.

3. The method of claim 1 further comprising the steps of:
creating a slide chain rule set describing computer readable instructions for interpreting and/or parsing data stored in data blocks; and
storing said slide chain rule set as said fork block payload.

4. The method of claim 1 further comprising the steps of:
creating a slide chain rule set describing computer readable instructions for verifying the validity of data blocks; and
storing said slide chain rule set as said root block payload.

5. The method of claim 1 further comprising the steps of:
creating a slide chain rule set describing computer readable instructions for verifying the validity of data blocks; and
storing said slide chain rule set as said fork block payload.

6. The method of claim 1, further comprising the steps of:
creating a first slide chain rule set comprising computer readable instructions for interpreting and/or parsing data stored in data blocks;
storing said first slide chain rule set as part of said root block payload
creating a second slide chain rule set comprising computer readable instructions for interpreting and/or parsing data stored in data blocks;
storing said second slide chain rule set as part of said fork block payload;
creating a third slide chain rule set comprising computer readable instructions for verifying the validity of data blocks; and
storing said third slide chain rule set as part of said root block payload.

7. A system for securely storing data across a network in a multi-dimensional distributed database, said system comprising:
processor;
a non-volatile computer memory storing computer readable instructions configured to:
generate a blockchain comprising linked data blocks, said blockchain being configured to propagate one or more branching blockchains, wherein any existing branching blockchain is configured to propagate one or more additional branching blockchains, wherein each of said branching blockchains has a fork block from which said one or more branching blockchains can grow in multiple directions thereby forming a multi-dimensional database known as a slidechain, wherein said growth occurs by adding new data blocks awarded each time a participating node in the network propagates an acceptable block with corresponding block hash, said fork block comprising a customizable set of protocols that define, for each block in said branching blockchain at least how block data is stored and interpreted, how block validity is verified, how valid chain consensus is achieved, and criteria for generating a new block, wherein data stored in a block cannot be modified without invalidating all subsequent blocks, wherein generating said blockchain or branching blockchain includes:

creating a root block payload to be included as part of a root block, wherein a root block comprises the root block payload and a root header, computing a root data hash from at least part of the root block payload;

creating the root header comprising at least the root data hash, a root timestamp, a root cryptographic nonce, a root proof standard, and a root data descriptor;

computing a short hash from inputs of at least said root data hash, said root timestamp, said root proof standard, and said root data descriptor;

storing data as a fork block payload to be included as part of the fork block, wherein said fork block comprises a fork block payload, a fork header, and one or more authorized fork hashes;

computing a payload hash from at least part of the fork block payload;

creating a fork block header comprising at least said payload hash, a previous block hash, a payload timestamp, a payload cryptographic nonce, a payload proof standard, a fork block flag, and a payload data descriptor;

storing said short hash in said fork block as said one or more authorized fork hashes;

computing the fork header hash from inputs of at least said one or more authorized fork hashes, said payload hash, said previous block hash, said payload timestamp, said payload cryptographic nonce, said payload proof standard, said fork block flag, said payload data descriptor;

storing said fork header hash as part of said root header; and computing a root header hash from inputs of at least said root data hash, said root timestamp, said root proof standard, said root data descriptor, said root cryptographic nonce, and said fork header hash.

8. The system of claim 7 wherein said computer readable instructions are further configured to:
create a slide chain rule set describing computer readable instructions for interpreting and/or parsing data stored in data blocks; and
store said slide chain rule set as said root block payload.

9. The system of claim 7 wherein said computer readable instructions are further configured to:

create a slide chain rule set describing computer readable instructions for interpreting and/or parsing data stored in data blocks; and store said slide chain rule set as said fork block payload.

10. The system of claim 7 wherein said computer readable instructions are further configured to:

create a slide chain rule set describing computer readable instructions for verifying the validity of data blocks; and store said slide chain rule set as said root block payload.

11. The system of claim 7 wherein said computer readable instructions are further configured to:

create a slide chain rule set describing computer readable instructions for verifying the validity of data blocks; and store said slide chain rule set as said fork block payload.

12. The system of claim 7, wherein said computer readable instructions are further configured to:

create a first slide chain rule set comprising computer readable instructions for interpreting and/or parsing data stored in data blocks;

store said first slide chain rule set as part of said root block payload;

create a second slide chain rule set comprising computer readable instructions for interpreting and/or parsing data stored in data blocks;

store said second slide chain rule set as part of said fork block payload;

create a third slide chain rule set comprising computer readable instructions for verifying the validity of data blocks; and store said third slide chain rule set as part of said root block payload.

13. The system of claim 7, wherein a plurality of new blocks can be generated simultaneously by adding new blocks to different blockchains in said slidechain.

14. The system of claim 7, wherein each fork block in said slidechain has a different set of protocols than every other fork block in said slidechain.

15. The system of claim 7, wherein each blockchain in said slidechain contains distinctive fields or types of data.

16. The system of claim 7, wherein said algorithm is part of said criteria for generating a new block.

* * * * *